June 17, 1930.  F. A. GERCICH  1,764,719
GAS BURNER INSTALLATION
Filed Jan. 21, 1928
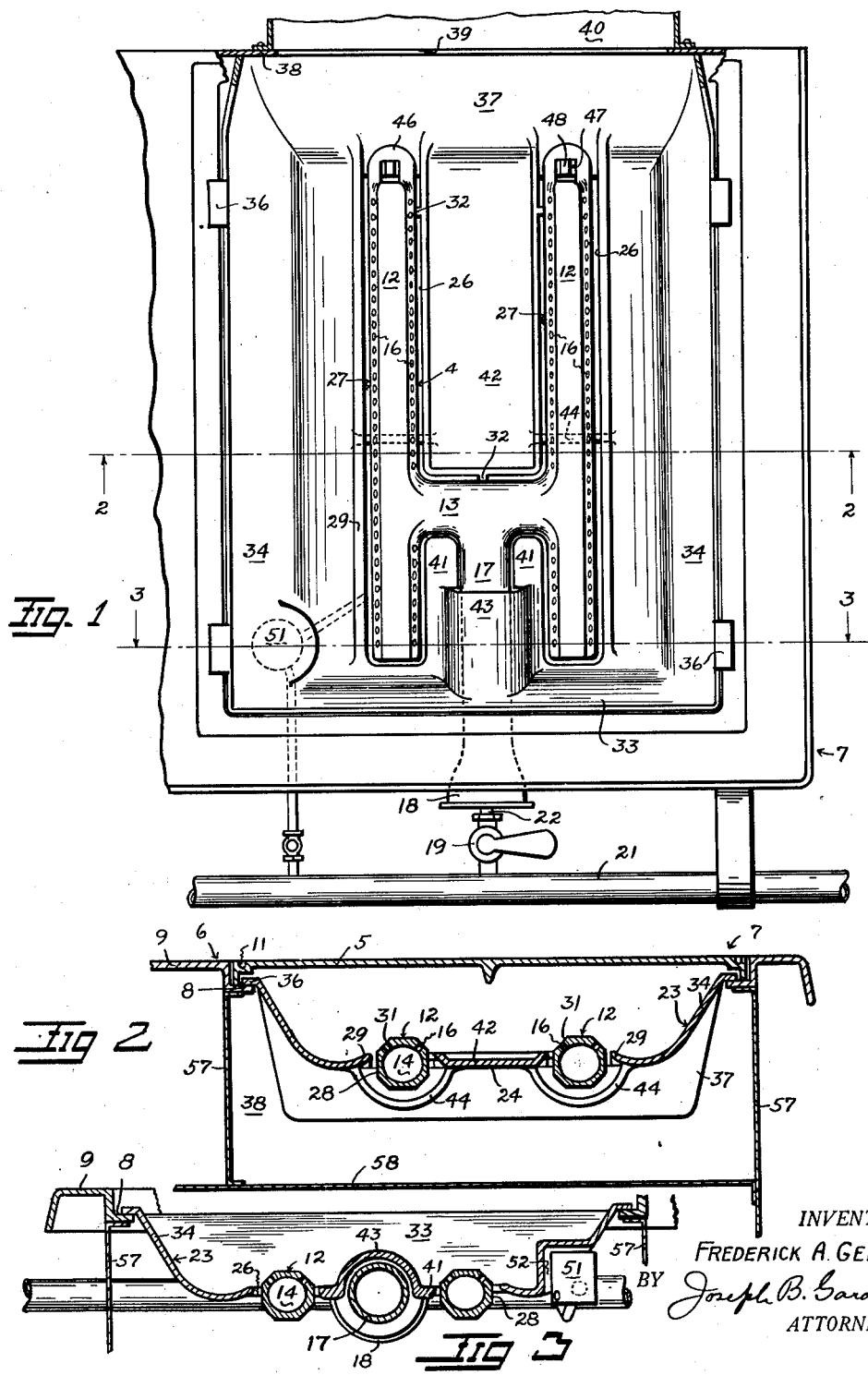
INVENTOR.
FREDERICK A. GERCICH
BY Joseph B. Gardner
ATTORNEY.

Patented June 17, 1930

1,764,719

UNITED STATES PATENT OFFICE

FREDERICK A. GERCICH, OF OAKLAND, CALIFORNIA, ASSIGNOR TO HAMMER-BRAY COMPANY, OF OAKLAND, CALIFORNIA, A CORPORATION OF CALIFORNIA

GAS-BURNER INSTALLATION

Application filed January 21, 1928. Serial No. 248,358.

My specification relates to a gas burner and an installation therefor.

An object of the invention is to provide an improved gas burner for evenly applying heat over a rectangular portion of a cooking top.

Another object of the invention is to provide in association with the burner, means cooperative therewith to control the secondary air supply thereto and the distribution of heat therefrom.

A further object of the invention is to utilize the aforesaid means for removably supporting the burner in operative position.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings,

Figure 1 is a fragmentary plan view of a stove embodying the invention, a displaceable cooking top portion of the stove being removed.

Figure 2 is a fragmentary sectional view taken on the line 2—2 in Figure 1, and showing the displaceable cooking top portion in its place.

Figure 3 is a fragmentary sectional view taken on the line 3—3 in Figure 1.

As herewith particularly illustrated, the invention is incorporated with a burner 4 disposed for heating a rectangular portion 5 of a cooking top 6 of a stove 7. As shown, the cooking top portion 5 comprises a removable plate member and is mounted on a depressed seat 8 provided around the opening provided therefor in the fixed portion 9 of the cooking top whereby the top surfaces of the cooking top portions 5 and 9 may be flush, as is desirable. In the present embodiment, the cooking top portion, or plate, 5 is provided with a continuous groove 11 in its top surface adjacent its edges whereby it is arranged for use as a griddle.

The burner 4, it will now be noted, comprises opposed and parallelly related portions 12 and a connecting portion 13 coplanar with the portions 12. The portions 12 are hollow to provide fuel passages 14, and the portion 13 is provided with a passage connected with both of the passages 14, it being noted that this burner portion is arranged to essentially function as a manifold for the portions 12. Jet openings 16 are provided in the burner portions 12, two rows of such openings preferably being provided in each portion. In order to effect an even distribution of heat from the burners, the openings of the different rows thereof are angularly related—preferably, and as shown, the jet openings of the different rows of a burner portion 12 make angles of substantially 45 degrees with a perpendicular to the plane of the burner. In this manner, the flame jets of the burner portions are arranged to define planes of combustion obliquely directed against the top plate 5, the spacing of the burner from the plate being such that the heat of the jets is evenly distributed to the entire plate.

Extending laterally from the burner portion 13 at an intermediate portion thereof and in the general plane of the burner is a fuel supply conduit 17, such conduit extending in parallel relation to the portions 12 and beyond their extremities to terminate in an air mixer 18 of any suitable type. Fuel is arranged to be supplied to the burner through a cock 19 mounted on a fuel supply pipe or manifold 21 disposed along the front of the stove and having the nozzle 22 thereof discharging into the mixer, it being noted that the nozzle 22 is arranged to function as a partial support for the burner in a usual manner. Preferably, and as shown, the burner portions 12 and 13, the conduit 17, and the mixer 18 are formed as an integral unit.

Means are provided for controlling and directing the necessary secondary supply of air into the flame jets of the burner. Mounted in the space below the plate 5 is a member 23, such member having a bottom plate portion 24 disposed horizontally and provided with a perforation 26 of the same general outline as the burner whereby the plate 24 is arranged to freely receive the burner in said perforation thereof in generally coplanar relation. The edges of the perforation 26 opposite the burner portions 12 are so spaced from said portions as to provide air passages 27 of proper width for allowing a sufficient air flow upwardly therethrough to supply the necessary secondary air for the flame jets of the burner, such jets, by reason of their obliquity, being in the path of the air discharged from the passages 27. To insure a proper direction of the air through the passages 27, the burner portions 12 are preferably formed with substantially plane side faces 28, and the opposed edge portions 29 of the plate 24 are turned upwardly, whereby the burner faces 28 and plate edge portions 29 cooperate to define, in effect, slit-like nozzles providing the passages 27 and discharging substantially vertically. Preferably, and as shown, the burner faces 28 terminate at their upper edges in oblique faces 31 having the jet openings 16 therethrough. To insure a lateral centering of the burner in the plate opening 26, horizontal projections 32 are provided at appropriate points of the plate edge portions 29 for engagement with the burner.

The passages 27 are preferably arranged to provide the sole air supply to the combustion space defined between the plate 24 and the top plate 5. Accordingly, and as shown, coterminous front and side edge portions 33 and 34 respectively of the plate 24 are directed upwardly as walls to terminate against the plate 5, horizontal extensions 36 of the walls 34 being provided for engagement in the seat 8 of the fixed top portion 9, to effect the support of the member 23, which member, it will now be clear, comprises the plate 24, walls 33 and 34, and flange 36. A rear edge portion 37 of the plate 24 is preferably offset downwardly to increase the depth of the combustion space thereat and terminates at a vertical wall 38 of the stove, such wall providing between the plate portion 37 and the cooking top an outlet opening 39 discharging into a suitable vent conduit 40. In this manner, the only air introduced into the combustion space for the burner is that through the passages 27, and such passages are preferably so designed as to admit only the necessary air for combustion purposes.

With the plate 24 formed as described, it will be noted that tongue-like portions 41 and 42 are defined therein, such portions respectively extending oppositely from the front and rear portions of the plate and between the burner portions 12. When, as is herewith disclosed, the member 23 is formed as a one-piece unit, it is desirable to secure portions 41 and 42 to the plate in such manner that they cannot become marked out of the plane thereof, and means are provided for so securing the portions 41 and 42 with respect to the remaining plate portions. As herewith particularly disclosed, the means for rigidly securing the plate portions 41 in place comprises a cylindrically curved bridge member 43 extending over the burner conduit 17 to connect the plate portions 41 at opposite sides thereof and connected to the front wall portion 33 of the plate 24, while the plate portion 42 is secured in place by means of bridges 44 arcuately curved beneath the burner portions 12 and secured to the plate portions 42 adjacent the free end thereof. Preferably, and as shown, the bridges 43 and 44 are provided as integral portions of the plate 24, it being noted that the bridge 43 is somewhat wider axially than are the bridges 44.

The member 23, it will be noted, is also utilized to provide the necessary support for the inner end of the burner. Accordingly, and as shown, the inner ends of the burner portions 12 are provided with extensions 46 arranged to be seated on the plate 24 opposite the inner ends of the plate perforation 26. To insure a proper positioning of the burner longitudinally of the perforation 26, the extensions 46 are perforated as at 47 to receive lugs 48 extending from the seats provided for the extensions 46. To remove the burner from the mounting now described, the inner end would first be lifted from engagement with the lugs 48 and the burner then moved longitudinally rearwardly to free the mixer 18 thereof from the cock nozzle 22. After tilting the front end of the burner downwardly for clearing the cock 21, the burner is then moved longitudinally forwardly through the plate opening 26 and so from the stove. The mounting of the burner would, of course, be effected by performing the foregoing operations in the reverse order. In connection with the mounting and dismounting of the burner from generally beneath the member 23, it is noted that the bridges 43 and 44 are particularly designed and disposed to permit such manipulation of the burner.

Preferably, and as shown, an igniter 51 for the burner is provided, said igniter being disposed and suitably secured in a downwardly opening socket 52 formed in the member 23 adjacent the front thereof and being connected with the manifold pipe 21 through a cock 54 and conduit 56. Preferably, the igniter 51 is of the flame-jet type and is arranged to discharge toward the burner beneath the plate portion 24 of the member 23. In this manner, the concussion effected by the explosion produced when the fuel is ignited or is turned off, is not able to put out the normally lit jet in the igniter.

It will now be noted that the burner and installation hereinbefore described is particularly intended for use in cooking stoves and that the combustion chamber defined between the cooking top and the member 23 forms part of a top-gas-burner compartment which may or may not have other burners therein. In the present embodiment, however, a gas burner compartment is provided solely for the burner 4 between the cooking top 6, the back wall 38, side walls 57 and a bottom wall 58, the portion of the burner compartment without the combustion chamber constituting a fresh air supply chamber for the burner.

I claim:

1. In a stove, an H shaped burner, a plate member substantially coplanar with said burner and having an H shaped opening therein in which said burner is disposed in such manner as to define an air passage between edges of the opening and portions of said burner, and a fuel supply conduit connected with the cross member of said burner and lying in substantially coplanar relation thereto, said plate being constructed to allow such disposition of said conduit.

2. In a stove, an H shaped burner, a plate member substantially coplanar with said burner and having an H shaped opening therein in which said burner is disposed in such manner as to define an air passage between edges of the opening and portions of said burner, a fuel supply conduit connected with the cross member of said burner and lying in substantially coplanar relation thereto, and a bridge member on said plate extending over the conduit and joining the portions of the plate which lie on opposite sides of said conduit.

3. In a stove, an H shaped burner, a plate member substantially coplanar with said burner and having an H shaped opening therein in which said burner is disposed in such manner as to define an air passage between edges of the opening and portions of said burner, a fuel supply conduit connected with the cross member of said burner and lying in substantially coplanar relation thereto, and a bridge member on said plate extending over the conduit and joining the portions of the plate which lie on opposite sides of said conduit, projections on ends of said burner having openings therein and upstanding members on said plate engaging in said openings, said plate having a slot therein between certain parallel portions of the H shaped opening, in which slot said conduit is disposed.

In testimony whereof, I have hereunto set my hand at Oakland, California, this 10th day of January, 1928.

FREDERICK A. GERCICH.